United States Patent
Parez et al.

(10) Patent No.: US 9,758,398 B2
(45) Date of Patent: Sep. 12, 2017

(54) AUTOMATIC CONTROL SYSTEM FOR DOSING CHEMICALS TO A SEWER SYSTEM

(71) Applicant: Veolia Water Solutions & Technologies Support, Saint-Maurice (FR)

(72) Inventors: Vincent Parez, Saint Cyr sur Morin (FR); Jean-Luc Million, Pontoise (FR)

(73) Assignee: Veolia Water Solutions & Technologies Support, Saint Maurice (FR)

(*) Notice: Subject to any disclaimer, the term of this patent is extended or adjusted under 35 U.S.C. 154(b) by 697 days.

(21) Appl. No.: 14/202,177

(22) Filed: Mar. 10, 2014

(65) Prior Publication Data

US 2014/0263084 A1 Sep. 18, 2014

Related U.S. Application Data

(60) Provisional application No. 61/791,622, filed on Mar. 15, 2013.

(51) Int. Cl.
| | | |
|---|---|---|
| C02F 1/00 | (2006.01) | |
| C02F 1/72 | (2006.01) | |
| C02F 101/10 | (2006.01) | |

(52) U.S. Cl.
CPC .............. *C02F 1/72* (2013.01); *C02F 1/008* (2013.01); *C02F 2101/101* (2013.01); *C02F 2209/40* (2013.01); *C02F 2303/02* (2013.01); *C02F 2307/08* (2013.01)

(58) Field of Classification Search
None
See application file for complete search history.

(56) References Cited

U.S. PATENT DOCUMENTS

| | | | | |
|---|---|---|---|---|
| 4,150,683 | A | * | 4/1979 | Simon ...................... E03F 3/00 137/1 |
| 2005/0224409 | A1 | | 10/2005 | Harshman et al. |
| 2007/0074758 | A1 | | 4/2007 | McQuade et al. |
| 2009/0242468 | A1 | | 10/2009 | Corben et al. |
| 2011/0049061 | A1 | | 3/2011 | Hale et al. |
| 2011/0168609 | A1 | * | 7/2011 | McQuade ............... C02F 1/008 210/87 |

FOREIGN PATENT DOCUMENTS

WO 2004049116 A2 6/2004

OTHER PUBLICATIONS

Bentzen, G., et al., "Controlled Dosing of Nitrate for Prevention of H2S in a Sewer Network and the Effects on the Subsequent Treatment Processes", Water Science & Technology, Jan. 1, 1995, pp. 293-302, vol. 31, No. 7, XP055114093.

* cited by examiner

*Primary Examiner* — Richard Gurtowski
(74) *Attorney, Agent, or Firm* — Coats & Bennett, PLLC

(57) ABSTRACT

A process and system for determining injection rate of treatment chemicals to eliminate or reduce downstream noxious gas emissions in a wastewater collection system. The process and system provides for treatment chemical injection at a pumping station or directly on a force main wherein dosage is calculated based on current and historical data relative to the pumping station.

12 Claims, 3 Drawing Sheets

AUTOMATIC CONTROL SYSTEM FOR DOSING CHEMICALS TO A SEWER SYSTEM

Applicant claims priority based on U.S. Provisional Patent Application No. 61/791,622 filed Mar. 15, 2013. The subject matter of this application in incorporated herein by reference.

BACKGROUND OF THE INVENTION

Wastewater treatment includes collection of wastewater from points where the wastewater is generated to treatment facilities where the wastewater is treated for reuse or discharge to the environment. Collections systems vary in design, based on the distribution of wastewater generation points and the general type of wastewater produced. Municipal wastewater treatment systems are examples of treatment systems where a particular treatment facility may receive wastewater, or sewage, from numerous points of generation that are distributed over sometimes very large geographic areas.

In the process of collecting municipal sewage, for example, collections systems include extensive arrays of piping and pumping stations. Thus, there may be miles of piping and tens to hundreds of pumping stations involved in one system. Moreover, municipal sewage, for example, comprises contaminants that support the generation and emission of various objectionable, noxious, and even dangerous and damaging gases. For example, the constituents of municipal wastewater include matter and organisms that support the evolution of sulfides in the wastewater. As a result, hydrogen sulfide gas may be emitted from the wastewater. Such emission of hydrogen sulfide gas within the collection system and treatment facilities the system serves can be quite damaging to this infrastructure, resulting in corrosion and failures of components in the system. Further, inevitable release of hydrogen sulfide gas to the environment creates an objectionable odor that is undesirable to those living and working near the system. Indeed, at sufficiently high concentrations, hydrogen sulfide gas can be injurious the humans and animals even to a point of causing deaths.

There have been various approaches to eliminating or reducing the emission and release of hydrogen sulfide gas from wastewater. Generally, extant approaches employ various configurations of control systems to control the injection of sulfide reducing or inhibiting chemicals into the wastewater. These typically involve sensing downstream hydrogen sulfide emission, and feeding back that information in a closed loop control system deployed at an upstream injection site. Such closed loop control systems thus attempt to form an error signal representing the difference in the desired downstream emission level and the measured downstream emission level by computing and injection an amount of chemical reactant apparently necessary to drive the error signal to zero. Such systems can be expensive due to remote emission detection and communication. Moreover, typical distances between chemical injection sites and measured emission sites on the collection network combined with varying flow conditions that impact residence time often create stability problems for such systems.

The influx of water from precipitation into the wastewater being treated for emission control can likewise have an effect on any approach to address the downstream emissions problem. Indeed, any entry of surface water or subsurface water into the collection system can cause problems. Extant approaches to addressing this problem have included remote and distributed monitoring of precipitation in efforts to account for the impact of water influx into the wastewater collection system. Many of these approaches suffer the same kinds of difficulties relative to stability as those described in cases of remote emissions sensing.

Further sensors and communications systems made necessary for many such approaches to the problem result in systems that are costly both to implement and to maintain.

Need exists for other approaches for downstream gaseous emission reduction or elimination in wastewater collection systems. Other approaches that tend to support stable and inexpensive operation are needed.

SUMMARY OF THE INVENTION

The present invention relates to a system and method for controlling the emissions of hydrogen sulfide gas in a sewer system. More particularly, the system includes a controller or controller circuit that continuously determines the dosage of a selected reactant that is required to maintain a selected level of control over downstream hydrogen sulfide gas emissions. Based on these dosage determinations, the controller automatically controls a dosage pump that injects the reactant into the wastewater. In one embodiment, the controller determines the dosage required without regard to actual downstream hydrogen sulfide gas concentrations.

In determining the dosage to be applied to the wastewater at a particular sewer site, the system and process focuses on determining a dry weather based dosage. The dry weather based dosage may, in certain cases, be adjusted based on data that suggests that the sewer site may be experiencing additional wastewater inflow due to rain.

In one embodiment, the final dosage determination is a function of the projected sulfide concentration in the wastewater, characteristics of the selected reactant, the temperature of the wastewater, the flow rate of the wastewater through the sewer site, and, in some cases, a factor relating to a precipitation-related weather event.

Other objects and advantages of the present invention will become apparent and obvious from a study of the following description and the accompanying drawings which are merely illustrative of such invention.

DETAILED DESCRIPTION OF THE INVENTION

Wastewater treatment systems rely on wastewater collection systems to collect wastewater at points of generation and convey the wastewater to wastewater treatment plants. During the collection and transport of wastewater, it is common that odiferous, noxious and even dangerous gaseous substances may evolve in the wastewater during transport. Due to the nature of wastewater collection systems, opportunity exists for such substances to be emitted into the air in areas adjacent portions of the collection system. For example, raw municipal wastewater often contains sulfide-producing materials and organisms that give rise to emission of hydrogen sulfide gas, $H_2S$. $H_2S$ has a highly objectionable odor, and at sufficient levels can be dangerous to facilities and those working and living in the vicinity thereof. In such cases, remediation methods are generally employed and may involve injection of one or more chemicals into the wastewater at one or more locations in the waste collections system. Typically, such chemicals are in the form of liquid reactants such as calcium nitrate, ferric chloride, dioxides, or other chemicals and combinations that can, for example, inhibit the formation of $H_2S$ or otherwise consume sulfide.

Figure 1:
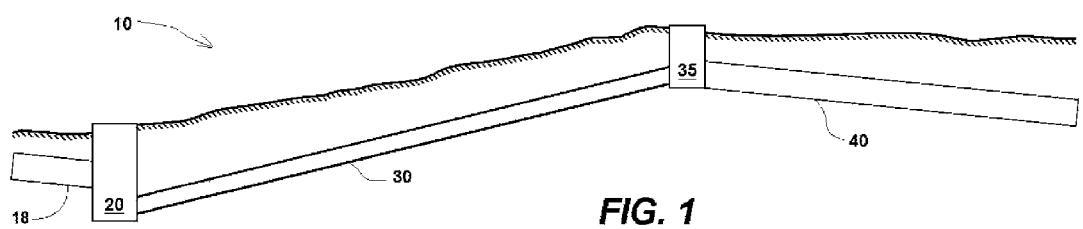
FIG. 1 is an elevation view of a segment of a wastewater collection system.

A portion of a wastewater collection system 10 is depicted in FIG. 1 where it is seen that wastewater arrives at a pumping station 20 through an inlet 18. Pumping station 20 includes one or more pumps, and the pumps may be constant volume on-off pumps or on-line variable flow pumps. The pump or pumps of pumping station 20 propel the wastewater or sewage into and through a so-called force main 30 through which the wastewater is moved up-slope and generally towards a waste treatment facility. As the terrain and geology varies, the force main may connect to gravity main 40 through which the wastewater may continue its movement enroute to the waste treatment facility under the action of gravity. Typically a manhole 35 is interposed where force main 30 delivers wastewater to gravity main 40. Manhole 35 provides service access to the collection system as well as venting of the collection system. Accordingly, noxious gases may be released into the atmosphere via manhole 35 as well as at other parts of the collection system. The gases often amount to safety or environmental hazards when emitted to the atmosphere. Further, such gases can often be corrosive to the infrastructure of the collection system. Operators of such wastewater collections systems thus often find it necessary to provide some kind of treatment to the wastewater, typically, for example, at pumping station 20, with the intention of reducing or eliminating the emission of noxious gases downstream in the collection system.

It is appreciated that collection network 10 may include a plurality of pumping stations, force mains, manholes, and gravity mains in order to serve a wastewater collection area and transport the wastewater to treatment facilities. The present invention is pertinent to such networks and may be implemented at various locations in such a network. Furthermore, the present invention may be deployed at any point in the network where there exists instrumentation to measure sewage flow. For purposes of discussion only, the present invention will be described in relation to a portion of collection network 10 including single pumping station 20, where the present invention interacts with the network, as shown in FIG. 1.

The present invention relates to a system and process for injecting a reactant into the sewage or wastewater at pumping station 20 for reducing or eliminating unwanted gaseous emissions at downstream locations such as manhole 35 and at other downstream portions of the infrastructure of collection system 10. More particularly, the present invention addresses determining a dosage rate of a treatment chemical based on how the system is impacted by short term and/or long term hydraulic variations such as seasonal population variations, infiltration level variations, or precipitation-related weather variations. More particularly, the method is operative in one embodiment to control reactant injection into the wastewater without utilizing any measurement of emitted gas downstream of pumping station 20 and without utilizing any direct measurement of the rainfall.

Implementation of the present invention entails the use of a controller, typically comprising a programmable logic controller (PLC). A treatment chemical injection pump may be incorporated in the controller or may be a part of pumping station 20 and interfaced with the controller. It is appreciated that more than one injection pump may be deployed in or with the controller. Accordingly, the controller is adapted in some embodiments to command one or more injection pumps. For purposes of further discussion, one injection pump will be considered. The controller accomplishes the following actions: a) store historical data regarding wastewater flows through pumping station 20, b) sense wastewater flow through pumping station 20, c) store the sensed data and compute moving averages of the data values over selected periods of time, d) determine required injection dosage rates of a treatment chemical, and e) control injection of the treatment chemical. The controller is accordingly programmed with software to be executed by the controller to accomplish the above actions. The software embodies the general and specific control logic of the present invention.

Figure 2:
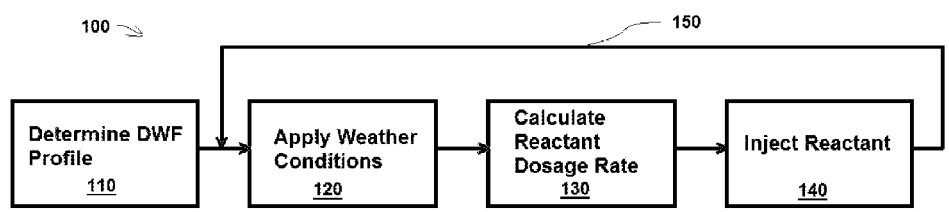
FIG. 2 is a flow chart depicting the overall control of reactant dosage for a wastewater pumping station.

The general control logic is depicted in FIG. 2. Prior to initiating a control for a day (24 hour period), a Dry Weather Flow (DWF) profile is determined for the particular day. The DWF profile contains expected wastewater flow, expected gas-producing contaminant concentration, and expected force main 30 residence time data for the day assuming dry weather conditions. Details of the DWF profile are discussed below. Control cycling commences at block 120 where any impact of weather conditions is applied. Generally, weather conditions can cause influx of precipitation water into the wastewater and thereby impact the concentration of gas-producing contaminants. Details of applying weather conditions are discussed below. Control then passes to block 130 where a reactant dosage rate is calculated. Factors that contribute to determining the dosage rate include the type of reactant being used, wastewater temperature, and the wastewater flow rate as well as any impact of wet weather conditions. Determination of these factors and the calculation are discussed further below. Control now passes to block 140 where the injector pump is commanded to inject the reactant at the calculated dosage rate. Control then passes via line 150 back to block 120, completing a cycle. Cycle times may be set based on experience to adequately account for the dynamics of the system. Generally, the cycle rate may be on the order of 1 cycle about every 5 seconds, more or less.

As discussed above, the present invention accounts for precipitation-related weather conditions by analysis of flow data and pump operation relative to pumping station 20 and the associated force main 30. Before further describing the particular processes involved, it is instructive to consider the general characteristics of wastewater pumps and other features that are typically used in such installations as pumping station 20.

Pumping station 20 may include a plurality of pumps, either on-off, constant volume pumps or variable flow pumps/online pumps. For example, pumping station 20 may include one or more pumps deemed sufficient to handle normal dry weather flow and one or more additional pumps that can be activated to enable the pumping station to handle wet weather flow conditions At any instant in time, an on-off pump may have an active pumping rate of zero or the full rated capacity of the pump. A variable flow pump may have an active pumping rate generally of any value, from zero up to the maximum rated pumping capacity of the pump. Depending on load, at any particular time one or more or all of the pumps may be on or off in the case of station 20 comprising on-off pumps. Likewise, should station 20 comprise variable flow pumps, one or more of the pumps may be operating at different flow rates including zero flow. It is further appreciated that a collection of on-off pumps in pumping station 20 may be operated under stepwise control such that the pumping rate of the station is stepwise variable, varying from zero to the cumulative rated capacities of the pumps. For purposes of further discussion, pumping station 20 will be considered to have either a single fixed volume pump or a single variable volume pump. Thus, pumping station 20 may, in the case of on-off pumps, have a pumping status of on or off. In the case of variable flow pumps or stepwise-controlled fixed volume pumps, pumping station 20 may have a pumping status of off (zero flow) or any various flow rates up to the maximum capacity of the pumps.

Typically, pumping station 20 may comprise an inlet reservoir or wet well (not shown) into which incoming wastewater flows and from which the pump lifts the wastewater and propels it into and through force main 30. Generally, the pumping status of pumping station 20 when configured in an on-off pumping configuration may be controlled based on sensing the level of the wastewater in the wet well. In some situations, a wet well may not exist or sensing wet well water level may not be used. In such situations, on-off pumping status may be controlled by sensing the water level in the incoming pipe or inlet 18. It is appreciated that the wet well, when included, may be the site of injection of treatment chemicals. When a wet well is not included, or for other reasons, the injection site may be inlet pipe 18 or a point where pumping station 20 delivers wastewater to force main 30. For purposes of further discussion, it will be considered that control of pumping status in pumping station 20 is accomplished by sensing wet well water levels and that treatment injection is made into the wet well. When the level of the wastewater in the wet well reaches a pre-set maximum level, generally a float-activated switch signals the pump to start pumping and thus begin to draw down the wastewater in the wet well. That is, pumping tends to empty the wet well. Likewise, when the level of wastewater in the wet well reaches a pre-set minimum level, the pump is signaled to turn off and thus stop drawing wastewater from the wet well. With pumping stopped, continually incoming wastewater begins to re-fill the wet well. During the course of operation of pumping station 20 in the on-off pump configuration there can be an alternating series of wet well emptying phases and wet well filling phases. Each filling phase begins when pumping is triggered to stop by the wet well level reaching the pre-set minimum value and ends when pumping is triggered to start by the wet well level reaching the pre-set maximum value. Likewise, each emptying phase begins when pumping is triggered to start by the wet well level reaching the pre-set maximum value and ends when pumping is triggered to stop by the wet well level reaching the pre-set minimum value. The triggering of the pump can be accomplished by tracking so-called "time out" periods. For example, recording is made of the duration of the emptying phase. This duration, or emptying time, will be referred to herein as $TimeOut\_2$. Likewise, recording is made of duration of the filling phase and referred to herein as $TimeOut\_1$. The filling and emptying phases may typically be in the range of a few seconds to a few hours, and generally $TimeOut\_1$, the filling time, is greater than $TimeOut\_2$, the emptying time. Observation of these time out periods is used, as described below for on-off pumping station configurations, in assessing the impact of weather conditions, in particular precipitation, on the require dosage rate for treatment as is further discussed below.

For variable flow/online pumping configuration, the rate of flow of wastewater into the wet well of pumping station 20 is utilized in controlling the pump flow to keep the level or water in the wet well between desired upper and lower limits. For such configurations, the volume of wastewater pumped over a period of time, a few hours generally, and that volume in comparison to the volume of force main 30 are utilized in assessing the precipitation-related weather impact as is likewise further described below.

As those of skill in wastewater treatment know, often it is important to randomly vary the pre-set wet well upper (full) and lower (empty) levels to avoid the development of fat and grease rings on the side wall of the wet well. The controller may, in some embodiments, include sensing or controlling pre-set level changes in connection with the above-discussed utilization of time outs to detect precipitation-related weather impacts.

In some situations a combined sewage overflow (CSO) facility may be associated with pumping station 20 to accept and discharge overflow should it occur. The CSO facility may be equipped with a level indicator, typically an instrumented float or an ultrasonic sensor, which provides a measurement that indicates an overflow condition has been reached. The measurement may be referred to as $CSO\_Level$ reflecting the wastewater head at the CSO facility. The controller may, in some embodiments, include sensing $CSO\_Level$ and in connection with the above-discussed utilization of time outs to detect precipitation-related weather impacts.

The present invention entails using past Dry Weather Flow (DWF) profiles for pumping station 20. Historical data stored in the controller include such DWF profiles. Before further discussion of the control approach, it is instructive to consider how DWF profiles are formed. A DWF profile is a record of wastewater flow through a treatment site during a day (24 hours) without any effects of precipitation. Not only does a DWF profile provide information about wastewater flow rates during the day, but the profile also provides data on the chemical/biological properties of the wastewater that give rise to noxious downstream emissions. For example, in the example of reducing or elimination hydrogen sulfide gas, the DWF profile includes data regarding the sulfides in the wastewater. The DWF profile also includes data regarding the wastewater residence time in downstream force main 30. The residence time information is derived at each time on the profile, from the known volume (length×diameter) of force main 30 and the flow rate at that time. Sulfide data and residence data are included to enable determination of required treatment chemical dosage rates to curb noxious gas emission downstream based on wastewater flow measurements taken at pumping station 20. These data and properties for a particular DWF profile are identified by an I&I index. The I&I index is a ratio of the total night-time flow to the total day-time flow for the day (24 hours) represented by the particular DWF profile. A DWF profile, then, generally characterizes pumping station 20 as it operates in collection system 10 for a typical dry weather day of operation. It is appreciated that a DWF may be viewed as a table of numbers where each row represents a time and each column includes the value at each time or time period for one of the variables mentioned above. For example, one row in a particular DWF profile might be for, say, a one hour time period centered on 2:30 am, and the column for concentration would contain the value of sulfide concentration expected in the wastewater during that one hour period. Another column would contain the average flow rate of wastewater expected to occur during that period, and another column might contain the average expected residence time in the force main. It is further appreciated that a DWF profile might contain data for 24 one hour periods or for any other number of periods into which a 24 hour day might be segmented. Typically, average data over each of 24 one hour periods may form a DWF profile. In addition to the data for the 24 hour, for example, periods, each DWF profile will contain a single data item in which the I&I value is derived, as discussed above, for the particular profile.

It is appreciated, however, that the nature of dry weather flow into pumping station 20 may vary based on situations related to time of year, the time during a work cycle (weekdays versus weekends), and other major recurring events that can have impact on wastewater generation rates and chemical/biological properties in a municipal system, for example. In order to account for such variations, DWF profiles are developed based on historical data relative to pumping station 20 to represent the wastewater flow and its properties for these various kinds of situations. Thus, a plurality of DWF profiles are developed for pumping station 20 and these profiles are stored in the controller by procedures well known to users of controllers such as PLCs. Typically, three such DWF profiles are loaded and stored in the controller. As discussed further below, just before the beginning of each day of operation a DWF profile will be generated based on the stored profiles and the current and near term history of the wastewater flow through pumping station 20.

Immediately prior to each day of operation, normally during the preceding night, a DWF profile applicable to operating pumping station 20 during the upcoming day is generated. This is a once-a-day process as indicated in FIG. 2, block 110. This generated DWF profile is sometimes referred to as a virtual DWF profile because it is developed from data in two of the DWF profiles stored in the controller assuming there is or has been no precipitation affecting the flow of wastewater. To generate the virtual DWF profile, the maximum and minimum flow rates through pumping station 20 for each of a preceding number of night-time and day-time periods are ratioed to calculate a daily I&I for each day. The I&Is thus calculated are averaged to obtain an average I&I for the preceding number of days, typically five days. Averaging over several days tends to prevent an isolated precipitation event from unduly impacting the result. This average I&I is compared with the I&I values for the stored profiles. The average I&I value will usually lie between the I&I values of two "adjacent" stored profiles. In this case the virtual profile values for expected sulfide levels and expected residence times to be used for the upcoming day are calculated by interpolation between the corresponding values of the adjacent stored profiles. In the event that the average I&I for the preceding five days, for example, exceeds the largest I&I of the stored profiles, the profile values for the profile having the largest I&I are used for the upcoming day. In the event that the average I&I is less than the smallest I&I among the stored profiles, the profile values for the smallest I&I profile are used for the upcoming day. More particularly each point in time, the cumulative flow during a wet well emptying phase in the case of a pump station on-off configuration, or cumulative flow from a the last few hours, typically five hours, will be used to calculate the actual residence time in force main 30.

Returning now to the discussion of the control approach, after initially determining a DWF profile for the day, otherwise referred to herein as a virtual DWF profile, the present process generally entails three steps that are executed continuously and repeatedly throughout the day at repetition or cycling rates of, for example, one repetition every few seconds more or less. Each cycle includes first applying current and past weather conditions relative to pumping station 20 to take account of any impact of wet weather conditions that may be impacting the current flow. See block 120. Precipitation or rain events in or near the drainage area and occurring before or during a treatment period can increase the flow of wastewater into the collection system and, in particular, into pumping station 20. This effect may persist for some time after precipitation ends, and can have the effect of diluting the wastewater and consequently changing the concentrations of compounds in the wastewater that may cause downstream noxious emissions. This precipitation-related weather condition can also increase the volume of wastewater pumped through force main 30 over a time period. The increase in volume, or rate of flow, will reduce the residence time of the wastewater in force main 30. Application of weather conditions thus functions to take into account the effect of the precipitation or rain on the amount or dosage of chemical needed to accomplish the desired reduction or elimination of downstream noxious emissions. The procedure for accomplishing this includes determining a multiplier, K_Rain, to adjust as needed the treatment rate that would be derived from the virtual DWF profile information without accounting for weather. Detailed procedures for determining K_Rain are discussed below.

Once the precipitation-related weather impact is taken into account, a required rate of injection, or dosage rate, of treatment chemicals at pumping station 20 is calculated, as indicated in block 130. Calculation of the dosage rate includes not only accounting for the effects on the drainage area of precipitation-related weather, but also on the flow rate of wastewater through pumping station 20, the chemical reactant selected for injection, and the temperature of the wastewater. Indirectly, the residence time in force main 30 and the pumping status of pumping station 20 may also be involved. The choice of reactant and its effectiveness may be dependent on wastewater characteristics and network constraints. Generally, any of the known reactants for sewer injection may be utilized in the present invention. The dosage rate is generally calculated as mass of reactant per volume of water treated. For example, the dosage or injection rate may be expressed in pounds reactant per gallon wastewater. Based on the flow rate of wastewater, the injection rate is converted to pounds of reactant per minute, for example. Where the contaminant of interest is sulfides, for example, the injection rate may be expressed as the following dosage equation:

$$\text{Injection rate, lb/minute} = K\_Sulfide \times K\_Reactant \times K\_Temp \times K\_Rain \times \text{Flow (gpm)} \qquad [1]$$

K_Sulfide is derived from the virtual DWF profile and can be expressed as the expected sulfide concentration in the wastewater under dry weather conditions. K_Reactant is a factor known from the selection of the particular reactant or reactant mix to be utilized. The selection of reactant is experience-based. K_Temp is a factor that reflects the impact of variation of actual temperature of the wastewater on the effectiveness of the reactant. K_Temp is determined based on the well known Arrhenius Law for chemical reaction rate dependence on temperature and the deviation of actual measure temperature at any point in time from the average temperature during the process. K_Rain imposes the impact of dilution of wastewater due to precipitation. K_Rain is 1 under dry weather conditions and less than 1 under wet weather conditions. K_Rain is determined by the controller software in a manner described below. Flow is the current flow rate of wastewater through pumping station 20.

After calculating the reactant dosage rate, the injection pump is commanded by the control system to inject reactant at the calculated rate. See block 140. Control then cycles via line 150 to the next control cycle.

The control approach, as discussed above, includes applying weather conditions for each control cycle. See block 120 in FIG. 2. The process includes determining a multiplier, K_Rain, to be used in equation [1] in the next step, block 130, of the control cycle. K_Rain is determined based on wastewater flow rates, and the particular method is dependent on the type of pump deployed in pumping station 20. One embodiment of the present invention includes pumping station 20 being a constant speed pump which can be either running, or "on", or not running, or "off" as discussed above. This embodiment may be referred to as the on-off pump embodiment. Another embodiment of the present invention is applicable in situations where pumping station 20 is of the variable flow online pump type, which is described above. The embodiment may be referred to as the variable rate pumping embodiment. The procedures for determining K_Rain for each of these embodiments are discussed below.

Figure 3:
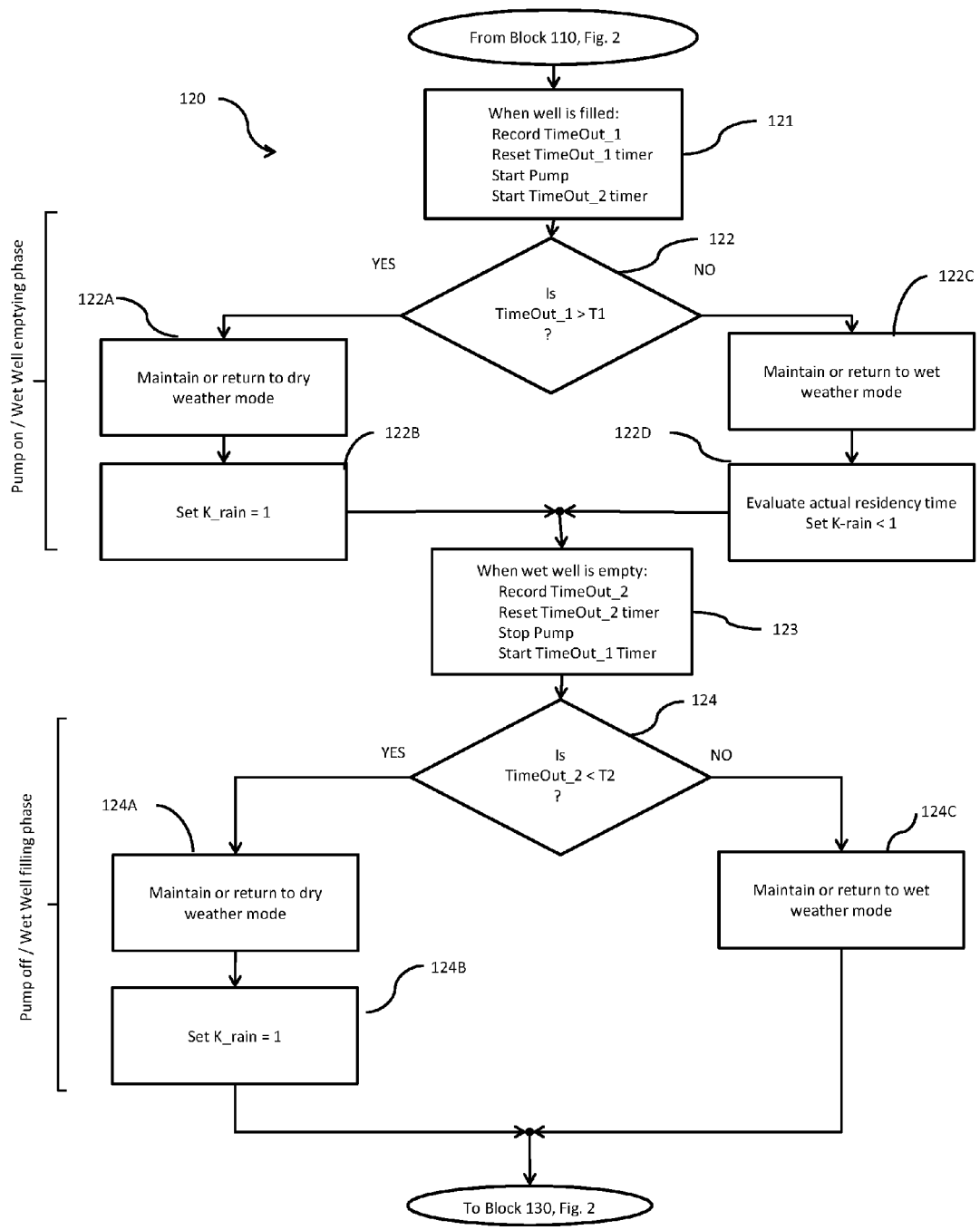
FIG. 3 is a flow chart depicting the method of determining the impact of precipitation-related weather on dosage rate for an on-off type pumping station.

The process 120 of applying precipitation-related weather conditions for the on-off pump embodiment entails the determination K_Rain. The process is illustrated in FIG. 3, which provides the general logic programmed in software loaded into the controller. It is appreciated that the logic of FIG. 3 is executed on each cycle of the general control functioning as depicted in FIG. 2 and discussed above. A single cycle will be discussed in the context of the single cycle succeeding a previous cycle. In the previous cycle, a TimeOut_1 timer was started and the pump was stopped to commence a filling phase. Control is considered to be at block 121. Control execution halts at block 121 until the wet well is filled. When the wet well is full, the value of TimeOut_1 is recorded, the TimeOut_1 timer is reset, the pump is started, and a TimeOut_2 timer is started as indicated in block 121. Control then passes to decision block 122 where the TimeOut_1 value, or filling time, is compared to a pre-set value, T1. If TimeOut_1 is less than or equal to T1 (e.g. the "NO" condition for block 122), it is tentatively concluded that, due to apparently rapid wet well filling, the flow is being increased due to precipitation-related weather, block 122C, and the wet weather mode is invoked. The actual residence time is evaluated as described above and a comparison of the actual residence time with the expected residence time from the virtual DWF profile for the day is made to produce the value of K_Rain<1 for the wet weather operating mode. See block 122D. If, on the other hand, TimeOut_1 exceeds T1, filling was apparently sufficiently slow such that it is tentatively concluded that no precipitation-related weather is impacting the quantity of wastewater flowing into pumping station 20, block 122A, and the operating mode is set to dry weather. The parameter K_Rain is therefore set equal to 1, block 122B. K_Rain being unity has the impact of informing the calculation of equation [1] that the dry weather mode is active and no adjustment in injection rate to account for wet weather is to be done. In contrast, when K_Rain is less than one, the injection rate is lowered to reflect the wet weather condition. Control now passes to block 123 where control halts until the wet well is empty. When the wet well is empty, or at the low level, the value of TimeOut_2 is recorded, the Timeout_2 timer is reset, the pump is stopped, and the TimeOut_1 timer is started. Control then passes to block 124 where the value of TimeOut_2 is compared with the parameter T2. If TimeOut_2 is less than T2, the indication is that there is no precipitation-related weather impact in effect sufficient to increase the time that was required to empty the wet well and thus it is confirmed that operation is to be in the dry weather mode, block 124A. K_Rain is accordingly set equal to 1, block 124B. If, on the other hand, TimeOut_2 is greater than or equal to T2 (e.g. the "NO" condition for block 124), the indication is that precipitation-related weather is causing sufficient additional water flow into pumping station 20 to require excessive time to empty the wet well and control passes to block 124C where wet weather operation is confirmed. The previously set K_Rain<1 value is confirmed. Generally the time out values as well as T1 and T2 are on the order of a few minutes T1 is generally larger than T2.

Figure 4:
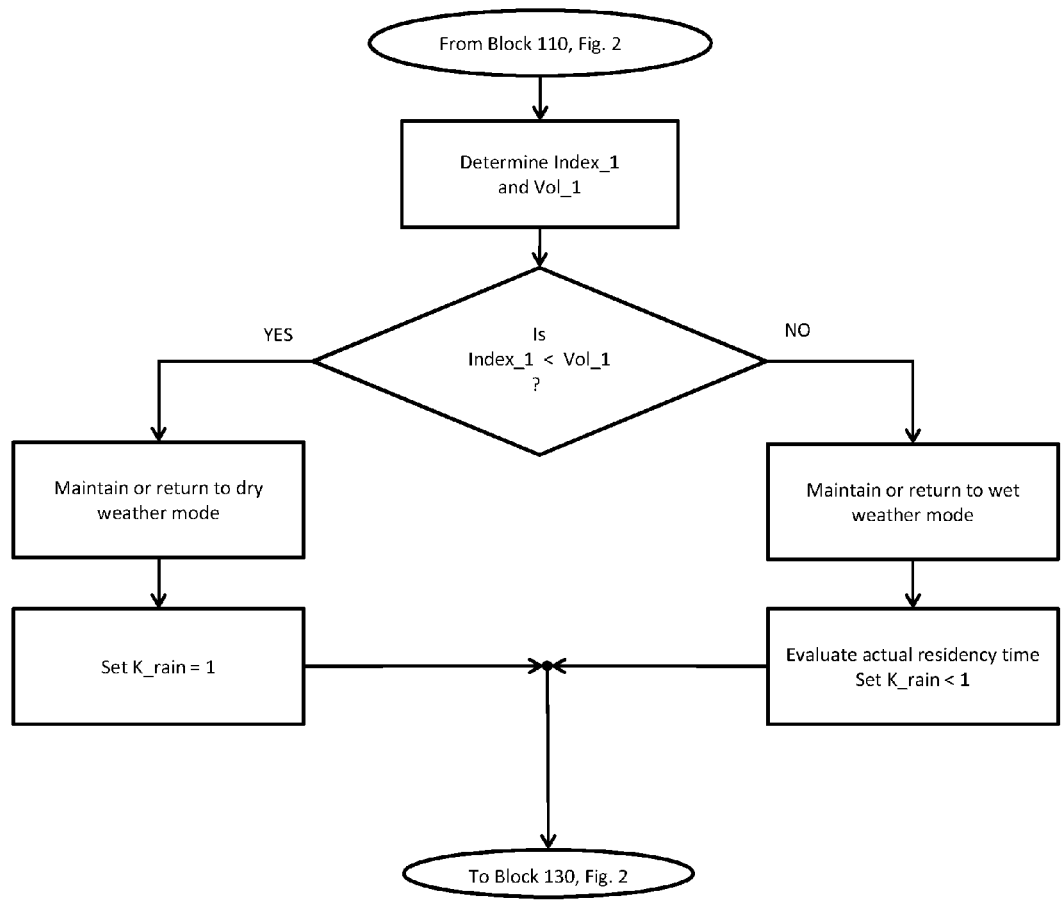
FIG. 4 is a flow chart depicting the method of determining the impact of precipitation-related weather on dosage rate for a variable flow type pumping station.

As noted above, a different embodiment relates to situations where pumping station 20 utilizes a variable rate or online pump configuration. This logic determining K_Rain for this embodiment is illustrated in FIG. 4. The logic of FIG. 4 depends upon a capability of the controller to retain and store cumulative flow through pumping station 20 for periods of at least several hours. Based on cumulative wastewater flow typically for the preceding five hours, a flow index, Index_1 is determined. Based on the volume of force main 30 (length×cross-sectional area) a volume index, Vol_1 is determined. When Index_1 equals or exceeds Vol_1 (e.g. the "NO" condition of the decision block in FIG. 4), an indication of increased flow due to precipitation-related weather is present. In this event the wet weather mode is confirmed, and based on actual residence time being compared to expected residence time, a value of K_Rain<1 is determined.

As discussed above, pumping station 20 may include a combined sewage overflow facility because, for example, of the history of the watershed where the pumping station is located. If, for example, there is history of weather events which may overload the pumping system. A CSO facility may be used. In such situations an additional amount of logic, not illustrated in the figures, may be utilized in connection with evaluating the parameter K_Rain to avoid the risk of any injection of reactant via the CSO facility to the natural environment such as a lake or watercourse. This logic would be followed within an execution cycle before control passes from block 120 to block 130. The logic includes sensing the wet well level and the level in the combined overflow sewage tank, CSO_Level. If the wet well level is higher than the CSO_Level, then regardless of any indications of precipitation-related weather impact as described above, the wet weather mode is invoked and K-rain is set equal to 0. Setting K_Rain to 0 means that, according to equation [1], there will be no injection of treatment chemicals. On the other hand, if the wet well level is lower than the CSO level, K_Rain is evaluated based on the above-described determination of dry weather or wet weather operating modes.

For emphasis, it is appreciated that the determination of K_Rain is made absent the collection of any current rainfall data. Rather, the determination is made based on sensing the impact of precipitation-related weather on wastewater flow based on measuring the flow and comparing the flow to expected values know from the virtual DWF profile for the day.

As described above, the present invention provides a process for determining the required injection rate of a treatment chemical into wastewater traversing a sewage pumping station 20. The process, while configured to reduce or eliminate downstream emission of noxious gas, does not depend upon measurement of downstream noxious gas level. Rather, the process depends upon the basic historical operating characteristic of pumping station 20 and force main 30 in collection system 10. The process also utilizes recent operating data and current wastewater conditions to calculate treatment dosage rates, which are controlled by a controller such as a PLC. The controller is programmed with software designed to implement the calculations and decisions involved.

Example

The actual factors in Equation [1] will vary, of course, depending on the operational considerations for station 20. In particular, while K_Reactant is a constant based on a selection of a reactant to utilize at station 20, K_Sulfide, K_Temp, and K_Rain may all vary with time over a day of operation as also will the wastewater flow rate. The following example further illustrates the process of determining the factors in Equation [1] for a particular application at a particular control cycle.

As discussed above, K_Sulfide is the expected value of sulfide concentration in wastewater passing through station 20 under dry weather conditions as of a particular time period or point in time. The concentration, and thus, K_Sulfide, are typically expressed in mg/l. The sulfide concentration is obtained from the virtual dry weather flow (DWF) profile during each control cycle, where the sulfide concentration is the expected dry weather sulfide concentration based on historical operation of the station. It will be remembered that the virtual DWF is generated before each 24 hour day of operation, generally the night before, based on recent flow data collected and stored by the controller and three or more stored DWF profiles representing historical, statistical flow and concentration properties for the station, as discussed above. For purposes of illustration, it will be considered that for a particular control cycle, say, for example, a cycle commencing at 10:00 am, the expected concentration of sulfides in the wastewater under dry weather conditions is 10 mg/l. Thus K_Sulfide for this cycle would be 10 mg/l, which, converting the units, is 0.00008345 lb/gal.

Generally, a single reactant is selected for a given installation or pumping station for a given period of operation. Various reactants may be utilized depending on the characteristics of station 20 and other consideration. Ferric salts such as ferric chloride, nitrate salts, or proprietary materials such as Bioxide, made by Siemens. Considerations of the corrosive impact of reactants on equipment, the impact reactants have on the quality and quantity of sludge produced in downstream wastewater treatment facilities are taken into account. All of these considerations are well known to those of ordinary skill in selecting reactants to reduce contaminants such as sulfides. For purposes of illustration, pumping station 20 was for a particular period of time operated using Bioxide, for which K_Reactant was known to be 20 g reactant/g sulfide.

K_Temp reflects the rate of reaction dependence on temperature variations as discussed above. In the particular example being discussed, the average temperature, Tav, having been observed up until 10:00 am was 15° C., and the temperature sensed, T, at 10:00 am was 16.5° C. K_Temp was calculated as $A^{(T-Tav)}$ where the value A may range from about 1.03 to about 1.17, and its selection is experience based. For illustrative purposes, for A=1.08, K_Temp becomes 1.12 and is dimensionless.

The factor K_Rain accounts for dilution of the wastewater due to infiltration from precipitation and the impact of precipitation on the residence time. The more diluted, for example, the wastewater, the lower the required reactant rate, so K_Rain takes on a dimensionless value that may vary from 0 to 1. As discussed above relative to the CSO feature, when an overflow is detected, K_Rain becomes zero and prevents the injection of any reactant. When wastewater flow rate, as discussed above, does not indicate any impact of precipitation, K_Rain is set to 1, reflecting that weather has had no impact on the needed level of reactant based on dry weather conditions. However, when flow observation indicates impact of infiltration, observed as otherwise unexpected increases in wastewater flow rate, K_Rain is set to a positive number or fraction that is less than 1. This is implemented in terms of a comparison of residence times in the force main. As the force main has a constant volume, the greater the flow rate the smaller the residence time, as the residence time is the force main volume divided by the wastewater flow rate. K_Rain is calculated as the ratio of the expected residence time based on the expected wastewater flow rate as obtained from the stored virtual DWF for the particular day of operation of station 20 to the average actual residence to the expected residence time. The average actual residence time is logged by the controller as a moving average with a period of from about an hour up to several hours, this period being experienced based to adapt the system to avoid unstable response due to spurious variations if flow due, for example, to sensor errors. For the example operation cycle, at 10:00 am, due to increased flow rate sensed over the preceding 50 minute period, the observed residence time was seen to be 85% of the expected residence time for that period. Thus, K_Rain was 0.85. Finally, the flow rate sensed at 10:00 am, again, generally a moving average of a given period of time up to 10:00 am, was 2.0 MGD. Converting the units, the flow rate was 1,388 gpm. Using the above-derived factor values, the required injection rate for the control cycle commencing at 10:00 am was, by Equation [1], the product of K_Sulfide, K_Reactant, K_Temp, K_Rain, and the wastewater flow rate:

$$0.00008345 \text{ lb/gal} \times 50 \text{ g/g} \times 1.12 \times 0.85 \times 1388 \text{ gpm}$$

which is 5.5 lb/min. Thus, at 10:00 am, the controller would command the injection system to begin injecting the reactant at a rate of 5.5 lb/min and to continue at that rate until the execution of the next control cycle when the varying factors are recomputed. The present invention may, of course, be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein.

The present invention may, of course, be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein.

What is claimed is:
1. A method of inhibiting the formation of odorous and noxious gas in a sewer network by dosing wastewater in the sewer network with an odorous or noxious inhibiting reagent, comprising:
   determining an odorous or noxious gas factor that is representative of an expected concentration of an odorous or noxious gas in the wastewater by employing one or more historical dry weather flow profiles that is based on historical data for the sewer network;

measuring a flow of wastewater through at least a portion of the sewer network;

determining a rain factor;

calculating a dosage rate for the odorous or noxious inhibiting reagent based on the measured flow and said factors;

pumping the odorous or noxious inhibiting reagent from a source and injecting the odorous or noxious inhibiting reagent into wastewater in the sewer network according to the calculated dosage rate;

wherein the method includes employing a series of dry weather flow profiles and indexing each of the dry weather flow profiles with a historical flow-based index and further including:

(i) calculating a current flow-based index based on the flow of wastewater through a portion of the sewer network during a selected period of time;

(ii) comparing the current flow-based index with one or more of the historical flow-based indexes; and (iii) based on the comparison, forming a virtual dry weather flow profile and extracting the gas factor from the virtual dry weather flow profile.

2. The method of claim 1 including determining a reagent factor for the reagent selected and further employing the reagent factor in calculating the dosage rate.

3. The method of claim 1 including determining the temperature of the wastewater and further utilizing the determined temperature to calculate the dosage rate.

4. A method of controlling an injection of an odorous or noxious gas inhibiting reagent into wastewater in a sewer network, comprising:

forming a series of historical dry weather flow profiles for selected periods of time wherein the historical dry weather profiles are based on historical data relating to the sewer network and includes expected concentrations of odorous or noxious gas in the sewer network;

determining a rain factor where the rain factor is representative of past or current rainfall in an area generally served by the sewer network;

measuring the flow of wastewater through at least a portion of the sewer network;

calculating a dosage rate of the inhibiting reagent based on the expected concentration of odorous or noxious gas in the sewer network, the rain factor, and the flow of wastewater;

pumping the inhibiting reagent from a source at the calculated dosage rate and injecting the inhibiting reagent into the wastewater in the sewer network; and and wherein the method includes determining a virtual dry weather flow profile based on the series of historical dry weather flow profiles and wherein the virtual dry weather flow profile provides the expected concentration of odorous or noxious gas in the sewer network.

5. A system for controlling an injection of a reagent into wastewater in a sewer network to inhibit the formation of odorous or noxious gas in the wastewater comprising:

a pump for injecting the reagent into the wastewater;

a controller for controlling the pump and the dosing of the reagent into the wastewater;

the controller configured to:

(i) determine an expected concentration of the odorous or noxious gas in the wastewater based on historical data for the sewer network;

(ii) determine a rain factor that is representative of past and current rainfall in a general area served by the sewer network;

(iii) determine the flow of wastewater through at least a portion of the sewer network; and (iv) based on the expected concentration of the odorous or noxious gas, rain factor, and wastewater flow, calculate a dosage rate for the inhibiting reagent;

(v) control the operation of the pump such that the pump injects the inhibiting reagent into the wastewater at the calculated dosage rate; and (vi) wherein the controller is further configured to store a plurality of historical dry weather flow profiles and to form a virtual dry weather profile based on at least one of the historical dry weather flow profiles.

6. The system of claim 5 wherein the controller is further configured to determine a volume of wastewater in at least a portion of the sewer network and compare the volume with a volume index and, based on said comparison, calculate the rain factor.

7. A method of controlling an injection of a noxious gas inhibiting reagent into a wastewater flowing through a sewer network comprising:

establishing historical data relating to the wastewater flowing through the sewer network including establishing a series of historical dry weather flow profiles where for different selected periods of time each dry weather flow profile includes a historical wastewater flow through the sewer network and a historical noxious gas producing contaminant concentration in the sewer network;

periodically forming a virtual dry weather profile based on the historical dry weather flow profiles where each periodic virtual dry weather flow profile for a selected period of time determines an expected wastewater flow through the sewer network and an expected noxious gas producing contaminant concentration in the sewer network;

measuring an actual flow of wastewater in the sewer network;

determining a rain factor where the rain factor is representative of rain or other precipitation impacting a general area served by the sewer network;

calculating a dosage rate of the noxious gas inhibiting reagent as a function of the rain factor, actual flow of wastewater in the sewer network, and the expected noxious gas concentration determined from the virtual dry weather flow profile;

controlling one or more inhibiting reagent injection pumps to inject the noxious gas inhibiting reagent in the sewer network according to the calculated dosage rate; and wherein the dosage rate calculated is also a function of the inhibiting reagent injected into the wastewater.

8. The method of claim 7 including determining the dosage rate of the noxious gas inhibiting reagent independently of any direct measurement of the noxious gas concentration in the sewer network.

9. The method of claim 7 wherein determining the dosage rate of the noxious gas inhibiting reagent is independent of any direct measurement of rainfall or precipitation.

10. The method of claim 7 wherein the dosage rate calculated is also a function of a measured temperature of the wastewater in the sewer network.

11. The method of claim 7 wherein the rain factor is a function of a volume of water moving in the sewer network.

12. The method of claim 7 including forming a new virtual dry weather flow profile every 24 hours.

\* \* \* \* \*